United States Patent [19]

Ciulin

[11] Patent Number: 5,020,104

[45] Date of Patent: May 28, 1991

[54] METHOD OF REDUCING THE USEFUL BANDWIDTH OF BANDWIDTH-LIMITED SIGNALS BY CODING AND DECODING THE SIGNALS, AND SYSTEM TO CARRY OUT THE METHOD

[75] Inventor: Dan Ciulin, Pully, Switzerland

[73] Assignee: Robert Bosch GmbH, Stuttgart, Fed. Rep. of Germany

[21] Appl. No.: 441,814

[22] Filed: Nov. 27, 1989

[30] Foreign Application Priority Data

Dec. 20, 1988 [DE] Fed. Rep. of Germany ....... 3842831

[51] Int. Cl.$^5$ .............................................. H04K 1/02
[52] U.S. Cl. ......................................... 380/6; 380/38; 375/22; 375/122; 381/29
[58] Field of Search ............... 380/6, 38; 375/22, 122; 381/29, 30, 31

[56] References Cited

U.S. PATENT DOCUMENTS

4,071,707  1/1978  Graf et al. .............................. 381/30
4,700,360  10/1987  Visser ................................... 375/122
4,817,141  3/1989  Taguchi ................................. 380/9

Primary Examiner—Thomas H. Tarcza
Assistant Examiner—David Cain
Attorney, Agent, or Firm—Frishauf, Holtz, Goodman & Woodward

[57] ABSTRACT

The useful bandwidth of a bandwidth-limited input signal (s(t)) is reduced, to obtain a coded signal (q(t)) by forming a combined input and feedback signal, low-pass filtering the combined signal, and passing the low-pass filtered signal through a feedback loop which includes symmetrical frequency-voltage (f/V) conversion, substantial amplification, and voltage-frequency (V/f) reconversion, the reconverted signal being combined with the input signal in a multiplier, the coded output signal being derived from the output of the low-pass filter. Amplification of the amplifier is so high that the bandwidth of the resulting frequency-modulated feedback signal is greater than the bandwidth of the original input signal. The resulting coded signal can be decoded by derived scanning signals which are combined with bandwidth-enhanced coded signals and processed in an inversion matrix for subsequent reconstitution of the original signal.

14 Claims, 6 Drawing Sheets

METHOD OF REDUCING THE USEFUL BANDWIDTH OF BANDWIDTH-LIMITED SIGNALS BY CODING AND DECODING THE SIGNALS, AND SYSTEM TO CARRY OUT THE METHOD

The present invention relates to a method and a system to reduce the useful bandwidth of a bandwidth-limited signal by coding the signal, and to a method and system to decode a coded bandwidth-limited signal, in other words, to a system of bandwidth compression and decompression of the bandwidth signal; and more especially to such methods and systems applicable to frequency-modulated signals.

BACKGROUND

Various processes are known to code a bandwidth-limited signal in order to compress the bandwidth of the signal, and then to decode such a coded signal. These methods are usually based on various technologies, such as for example linear predicting code (LPC), partial band coding, and the like. These known methods can be used only with very specific types of signals, for example signals representing speech, in which reduction factors of from 2 to 4 are possible without perceptible loss of signal quality.

THE INVENTION

It is an object to provide a method and a system to reduce the useful bandwidth of a bandwidth-limited signal by coding the signal and, thereafter, to a method and system to decode this so reduced signal, in which any type of signal can be handled without loss in quality and which permits large reduction or compression factors.

Briefly, the useful bandwidth of the signal is reduced, by coding the signal in this manner: The signal, which can be referred to as the input signal, is first low-pass filtered. The low-pass filtered signal forms the output. This output signal is then passed in a feedback loop. Within the feedback loop it is frequency-demodulated to form a frequency-demodulated feedback signal, for example in a symmetrical frequency-voltage (f/V) converter, then amplified, preferably highly amplified, and then the frequency is reconstituted by passing it, for example, through a voltage-frequency (V/f) converter. The resultant signal which has a higher equivalent frequency modulated index $m_o$ is multiplied with the input signal in a multiplier connected to the input signal ahead of the low-pass filter.

The signal is decoded; in accordance with a feature of the invention, the coded signal can be decoded e.g. by generating a first scanning signal by low-pass filtering a set of n pulses having a low duty ratio and uniform spectral density, applying the coded bandwidth-limited signal through a symmetrical frequency-voltage (f/V) converter, an amplifier, and a symmetrical voltage-frequency (V/f) converter and multiplying it with the first scanning signal. The set of the resulting signals are low-pass filtered with a limiting frequency of $f_0$ and stored in a group of n delay lines for predetermined time periods to form second scanning signals m(t,K) to be applied through an inverting circuit which also receives scanning signals of the coded bandwidth-limited signals. The so obtained signals are then processed in a matrix inversion circuit to generate scanning signals of the decoded or original signal s(t). The scanning signals of the decoded signal s(t) can be stored in a buffer for serial read-out and low-pass filtered with a limiting frequency of $f_1$. The pulses of the set or group of n pulses preferably have a duty ratio of 1/1000.

The systems to carry out the band compression and expansion with coding use well known components and stages customary in electronic apparatus, such as multipliers, integrators, dividers, inverters, logic circuits and the like, to carry out the functions above described.

The method and system of the present invention has the specific advantage that the useful bandwidth of any desired bandwidth-limited signal can be reduced while retaining the entire information. The compression factor will depend on system parameters. The system utilizes a cutting-up feature of the signal, in which the cutting-up code is dependent on the periodic function which is used and dependent on the type of symmetrical voltage-frequency converter or, respectively, the inverse thereof, namely the frequency voltage converter. By this cutting-up or chopping, it is possible that the intelligibility of the input signal is destroyed; of course, it can be reconstituted by decoding. This has an additional advantage, in that the coded signal permits an unambiguous inversion, that is, return to the original. It can be decoded unambiguously. Due to the compression of the signal, the signal-to-noise ratio upon transmission in a transmission channel having a uniform noise density distribution is improved. The bandwidth decompression can be carried out without changing the time range of the compressed or decompressed signals. Since the intelligibility of the input signal can be destroyed, the method and system can also be used in garbled voice communication.

DRAWINGS

FIG. 8 is a representation of errors upon matrix inversion when using time windows and FIG. 9 is a block circuit diagram of a system to expand the frequency range of a symmetric voltage-frequency converter by a factor of 2.

FIG. 10 and FIG. 11 representing a circuit-diagram of the two parts (sine converter and triangulare wave generation) of a symmetric V/f converter that corresponds to the block diagram of FIG. 2.

FIG. 12 representing a computer simulation of a "coder" and a "decoder" realized on "time windows".

FIG. 13 representing signals (as in FIG. 3) measured on a symmetric V/f converter as shown in FIG. 2, 10, 11.

The table of mathematical equations with the right symbols and/or definitions

DETAILED DESCRIPTION

A frequency-modulated signal s(t) can be defined by equation (1) within a period of time, in which as a limiting condition, the carrier frequency is assumed to be zero or null. $U_0$ is the amplitude of the signal s(t). $m_0$ in the formula is a constant which is an equivalent frequency deviation or, in the classical sense, the modulation depth or index. $\phi_0$ is a constant initial phase, and g(t) is the input signal. It is known that the necessary bandwidth for demodulated a frequency-modulated signal depends on a value of m and it is possible to reduce its bandwidth by means of frequency modulation feedback (FMFB).

Figure 1:
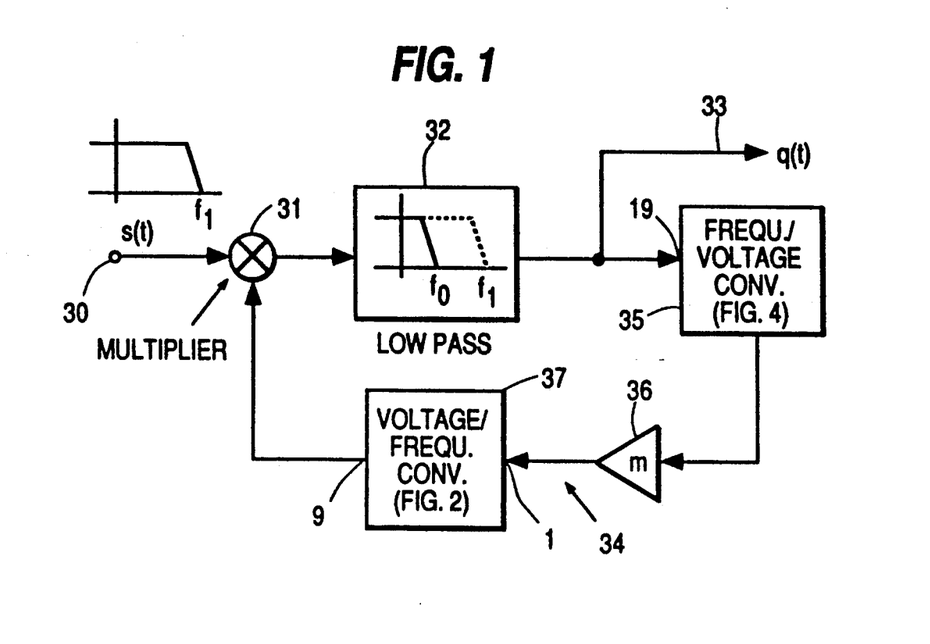
FIG. 1 is a general block circuit diagram of a system to reduce the useful bandwidth of an incoming signal s(t)

The circuit of FIG. 1 has an input terminal 30, connected to the signal s(t) which is connected to one terminal of a multiplier 31. The output of the multiplier 31 is connected to a low-pass filter 32, having a low-pass cut-off frequency $f_0$, as shown in FIG. 1. For comparison, the frequency bandwidth $f_1$ is shown in the block 32 in dotted lines. The output from the low-pass filter 32 forms the output 33 of the circuit. In addition, the output from low-pass filter 32 is connected to a closed feedback loop 34. The closed feedback loop 34 includes a symmetrical frequency-voltage (f/V) converter 35, the details of which will be described in FIG. 4, an amplifier 36 with an amplification factor $m_o$, and a voltage-frequency converter (V/f) 37, the details of which will be described with reference to FIG. 2. The output of the V/f converter 37 is connected to a second input of the multiplier 31.

The circuit of FIG. 1 has a control loop characteristic which is similar to a customary frequency modulation with feedback (FMFB) circuit, but considers further that the carrier frequency is assumed to be zero or null. This circuit, therefore, uses the low-pass filter 32 and, in order to obtain a strictly linear frequency-voltage relationship, as well as the inverse of voltage-frequency relationship, symmetrical converters 35, 37, respectively.

In frequency modulation, it is very important to retain phase relationships and phase information, since the instantaneous frequency $f_i(t)$ is the derivative of the instantaneous phase ($\phi_i(t)$). The FMFB circuits, as known, do not operate with zero carriers, but rather with carriers which are other than zero, and with bandpass filters, in which it is assumed that the instantaneous frequency is always larger than zero. If, however, the instantaneous frequency becomes negative, the phase may jump by as much as 180°. This cannot be realized with the customary FMFB circuits. Further, cases in which there is a substantial or large relationship of the instantaneous frequency with respect to the carrier frequency cannot be handled. The circuit in accordance with FIG. 1, however, does use a "zero carrier", and thus the instantaneous frequency may be negative, and the instantaneous frequency-to-carrier frequency ratio then goes towards infinity.

Before considering the circuit of FIG. 1 further, and the operation, in detail, it is appropriate to describe in detail the symmetrical V/f and f/V converters.

The output signal $U_f$ of a symmetrical voltage-frequency converter can be expressed mathematically by the equation (2).

Figure 2:
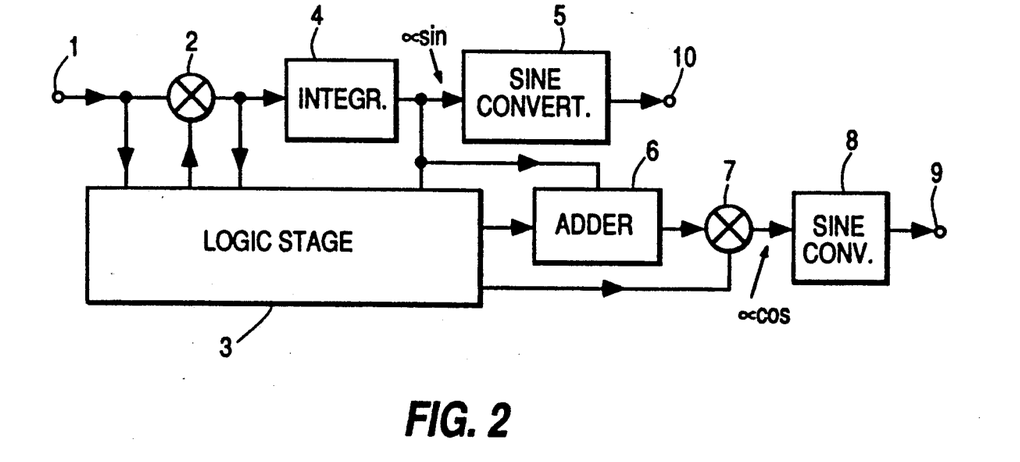
FIG. 2 is a block circuit diagram of a symmetrical voltage-frequency (V/f) converter.

Referring now to FIG. 2: The input 1 is coupled to a multiplier 2 and, further, to a logic stage 3. The logic stage 3 includes, preferably, a plurality of comparators, and a digital network having AND-gates, OR-gates, one XOR-gate and a flip-flop (FF). One output of the logic circuit 3 is connected to a further input of the multiplier 2. The output of the multiplier 2 is coupled to the input of an integrator 4. The output of the integrator 4 is connected to a sine converter 5, which has an output terminal 10. The output of the integrator 4, further, is connected to the logic stage 3 and to an adder 6. The adder 6 receives an output from the logic stage 3. The output of the adder 6 is connected to a second multiplier 7, the second input of which has another output from the logic stage 3. The output of the second multiplier 7 is connected to a further sine converter 8 which has an output terminal 9.

Figure 3:
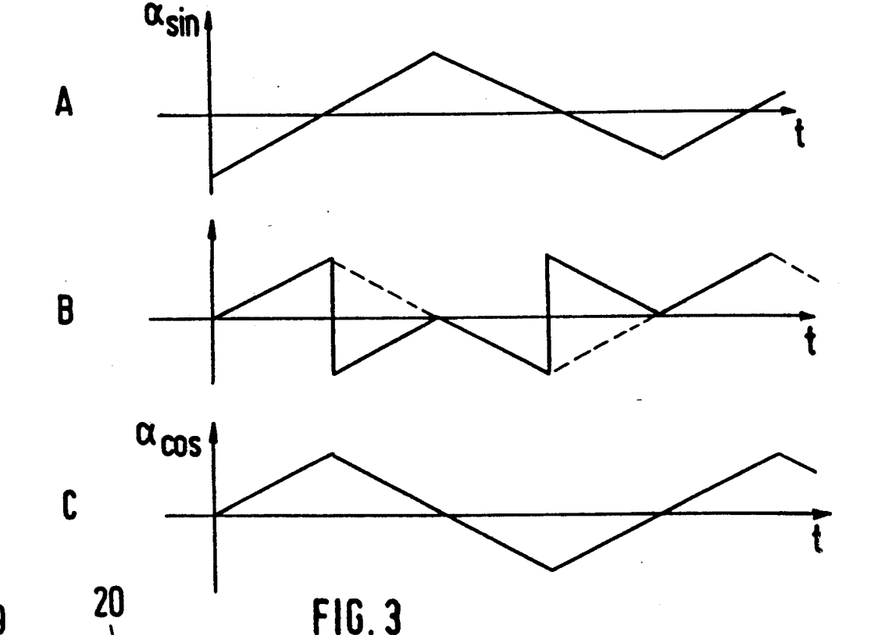
FIG. 3 is a series of graphs of voltage signals which arise at various positions or points of the voltage-frequency converter of FIG. 2.

Operation, with reference to FIG. 3:

The input signal $U_i(t)$ may have any desired wave form. For purposes of explanation, and for clarity, it is assumed that the input signal is a d-c voltage input signal. The input signal $U_i(t)$ is integrated in the integrator 4, resulting in a linearly rising signal, see graph A of FIG. 3. The integrator is so designed that its output voltage is limited to a predetermined amplitude. When the output voltage, due to the voltage-time relationship of the input signal reaches this limited or set output voltage, the sign at the input of the integrator 4 is reversed. This is done by the first multiplier 2, which multiplies the input signal with $+1$ or $-1$, in dependence on a control signal derived from the logic circuit 3.

When the input signal $U_i(t)$ is a d-c signal, the output of the integrator 4 will be the triangular signal of graph A of FIG. 3, in which the first multiplier 2 multiplies with $+1$ or $-1$, and the sign reversal occurs at the minimum, or maximum, respectively, of the triangular signal. The triangular signal is applied to the second sine converter 5 in which it is converted into a sinusoidal signal. The since converter 5 shifts the signal first in an amplifier to round the positive peaks of the triangular signal to a sine wave. It may be done by a non-linear differential stage. The signal is then conducted further via a buffer stage and a voltage divider to a further amplifier to invert the signal and then is applied to a further non-linear differential stage in which the negative peak or tip of the triangular shaped signal is rounded into a sinusoidal shape. A further buffer stage and a voltage divider then process the so formed signal and apply it to an output amplifier the output signal which is a true sinusoidal signal in accordance with the mathematical relationship (3) as set forth in the stable. Terminal 10 (FIG. 2) provides a signal which can be used in other systems—as for example frequency expansion of FIG. 9—but is not required herein since what should be obtained in the cosine signal at terminal 9.

The sinusoidal converter 5, described above, is only one example of a suitable circuit; other triangular-to-sinusoidal converters may be used.

To obtain a true cosine signal at the output of the first since converter 8, the triangular signal $\alpha$ sin from the output of the integrator 4 must be modified in order to generate a new triangular signal $\alpha$ cos, which, after processing in the first sinusoidal converter 8, provides the true cosine signal defined by equation (2). To modify the triangular signal $\alpha$ sin, adder 6 and multiplier 7 are used.

A time-dependant offset value is added in the adder 6, as seen in FIG. 3, in which the addition depends on the sign of the signal $\alpha$sin, that is, the offset value is changed in its sign each time when the signal $\alpha$ sin goes through zero. This results in the signal shown in graph B of FIG.

3, in the full lines. This is the signal which is available at the output of the adder 6. The portion shown by the broken line in graph B of FIG. 3 indicates the region in which the slope is reversed by multiplication in the multiplier 7 by ±1, so that, at the output of the multiplier 7, the signal a cos, in accordance with graph C of FIG. 3, will result.

Control of the adder 6 and of the multiplier 7 is carried out by the logic circuit 3 in dependence on control signals derived therefrom which, in turn, are generated in dependence on the input signal and on the output signal of the integrator 4.

The first sine converter 8 transforms the triangular signal a cos at the output of the multiplier 7 in a cosine formed signal in accordance with the equation (2).

The circuit of FIG. 9 permits expanding the frequency range of a voltage-frequency converter by a factor of 2. In order to obtain expansion by a factor of $2^n$, a plurality of stages can be cascaded. The output voltage after each space must be normalized to a suitable value so that the amplitude range is not exceeded.

Figure 4:
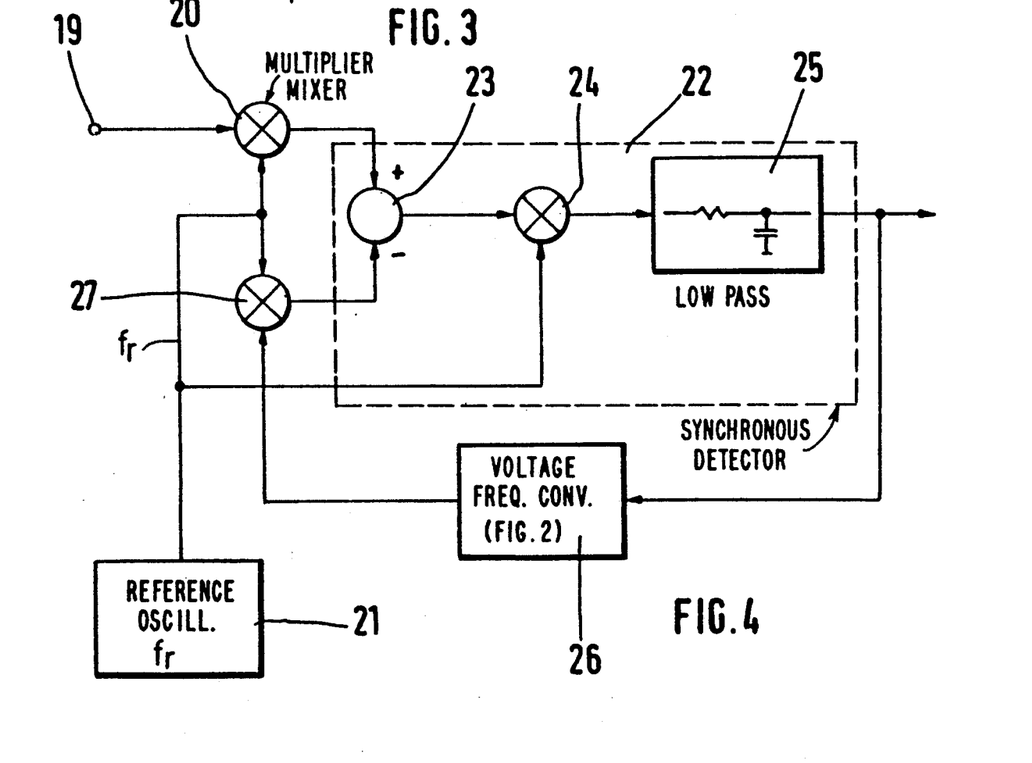
FIG. 4 is a schematic circuit diagram of a frequency-voltage (f/V) converter.

The V/f converter of FIG. 2 can be used in conjunction with an f/V converter, as shown in detail in FIG. 4, and which has a symmetrical frequency-voltage characteristic.

Referring now to FIG. 4: A first mixer 20 is connected to an input terminal 19. A reference oscillator 21 provides a reference frequency $f_r$, which is connected to the multiplier 20. The reference frequency supplied by the oscillator 21 is at least five to ten times the maximum frequency of the input signal. The output of the mixer or multiplier 20 is connected to a synchronous detector 22, which includes a series circuit formed by a difference stage 23 and a second mixer 24, as well as a low-pass filter 25. The second mixer or multiplier 24 is also coupled to the reference oscillator 21. A feedback loop includes a V/f converter 26, which is identical to the V/f converter described in connection with FIG. 2. Its input is connected to the synchronous detector 22 and the output thereof is connected to a third multiplier or mixer 27, the other input to which is derived from the reference oscillator 21. The output of the third mixer 27 is connected to a second input of the difference stage 23.

Operation, f/V converter, FIG. 4:

The input signal at terminal 19 is mixed in the first mixer 27 with the substantially higher reference frequency $f_r$, which is at least five to ten times that of the maximum frequency of the input signal, that is, the input signal is shifted towards a higher frequency. This is necessary in order to ensure proper operation of the synchronous detector 22 and in order to retain the time constant of the control circuit at a minimum. The control circuit is phase-sensitive. Thus, the low-pass filter 25 has a time constant of from 3–5 periods of the reference oscillator 21 and not that of the input signal. When the reference frequency $f_r$ is sufficiently large, the input signal can be subdivided into so many time intervals as can be considered, so that control "in phase" can be realized. The phase of the input signal is compared with the phase of the reconstituted signal in the V/f converter 26 in the difference stage 23. The resulting phase is then converted into a voltage in the analog phase detector formed by the second mixer 24 and the lower-pass filter 25. This phase detector compares the phase of the reference oscillator 21 with the phase of the output signal in the difference forming circuit 23 which, for example, may be an operational amplifier.

The foregoing system reconstitutes every signal if its maximum instantaneous frequency is at least smaller than $f_r$, preferably substantially smaller by a factor of from 5–10, in order to satisfy the requirement of "phase" and when the amplitude does not exceed the maximum amplitude of the V/f converter 26.

Due to the symmetry, the output at the V/f converter 26 will have the same signal as that which is applied to the input 19 when the input signal does not exceed the range of the system parameters. Thus, the circuit of FIG. 4 can then function as a true symmetrical f/V converter and can be considered as such.

Due to the above-described characteristics, the symmetrical V/f converter in accordance with the invention operates as a true phase/frequency modulator, and the symmetrical f/V converter as a true phase/frequency demodulator, and can be used as such.

Operation of system of FIG. 1:

The signal q(t) is demodulated in the f/V converter 35, amplified in amplifier 36 by an amplification factor $m_0$ in order to obtain the desired frequency deviation, or, respectively, the desired modulation (index) level or excursion. The amplified signal is frequency-modulated in the V/f frequency converter 37, and applied to the second input of the multiplier 31. It is necessary that $m_o$ is large enough so that the bandwidth of the frequency-modulated signal at the input to the multiplier 31 is greater than the bandwidth of the input signal s(t) at the other input. The frequency-modulated signal, obtained from the V/f converter 37, is multiplied in the multiplier 31 with the input signal s(t) and the result filtered in the low-pass filter 32, to obtain the output signal q(t). Due to the low-pass filter 32, q(t) cannot have a greater bandwidth than the bandwidth of the low-pass filter 32, so that a bandwidth compression factor $K_p$ as defined in equation (4) will result.

When the low-pass filter 32 is an ideal low-pass filter, the control loop of FIG. 1 operates in accordance with equation (4). Practically taking into account eq. (6) and (6') [eq. (6') represents a practical low-pass filter function] equation (5) becomes (7) and/or (11) because of equation (8), (8'), (9 and (10).

Equations (5), and/or (7) and/or (11) are non linear Volterra-Hammerstein integral equations. This equation has a single solution, and thus this coding method permits unambiguous decoding in order to reconstitute the input signal s(t).

The signals s(t) and q(t) can be considered as two signals defined by equation (1), in which only the parameter m has been changed. Thus, this coding method can be referred to as a redundance-reduction method. The coded signal q(t) can be considered as a signal, which appears to have lost any connection with the input signal s(t).

Decoding of a bandwidth compressed coded signal:

A compressed, coded signal, as defined by equation (7), will now be described. The signal which is being decoded is the signal q(t). This signal is known. The input s(t) is not known, and should be reconstituted. Thus, what previously was the output signal, for decoding, now forms the input, and what previously was the input will now form the output. An intermediate signal which is based on signal q(t), will be denoted r(t).

For decoding, with the signal q(t) known, but the original input signal r(t) can be reconstructed using equation (6) because $m_o$ is also known. Considering equation (6) and (6') equation (5) can be rewritten for practical purposes, as equation (7) and/or (11) which, in case of the "decoder" is a linear integral equation.

Since s(t) is a bandwidth-limited signal, it can represented by equation (8). Equation (8) can be rewritten as equation (8').

The unknown decoded signal s(t) thus is represented as a scanning sequence. By use of equations (7) and (8'), one obtains equations (9) and (10).

Equation (9) provides, for given discrete values of t between K and K+1 a linear system, by which the decoded signal s(t) can be reconstituted. Based on equations (9),(10), (11), (12), (13) and (14), a FORTRAN program to simulate the "decoder" was realized. The block-diagram represented in FIG. 5 is an "analog representation" of this program.

Figure 5:
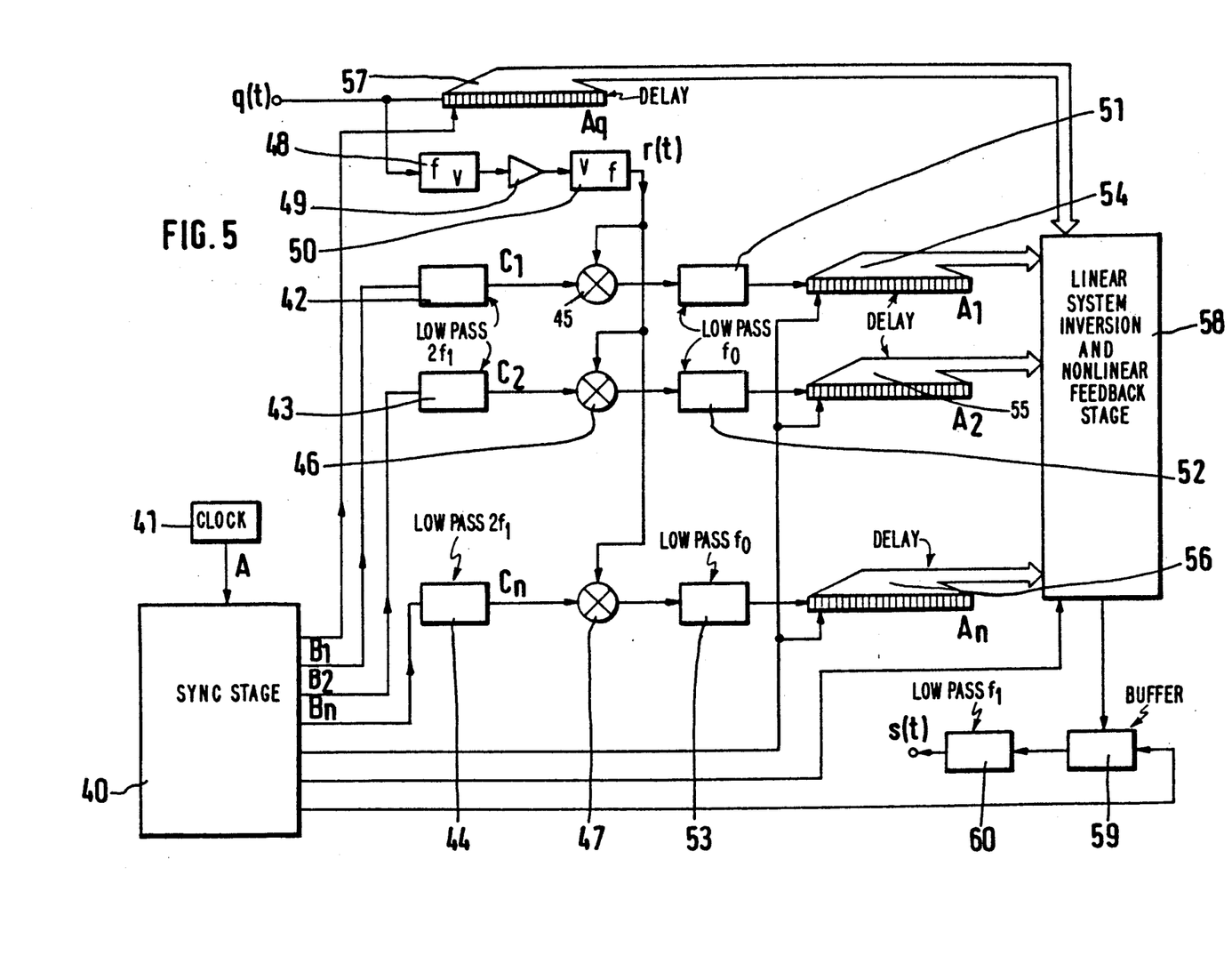
FIG. 5 is a decoding circuit to decode a bandwidth-limited signal coded in accordance with the system of FIG. 1.

Referring now to FIG. 5, which illustrates a system for decoding the coded signal q(t) derived from the system of FIG. 1:

Signals represented by equation (10) are derived, analogued, by use of Dirach pulses, which are low-pass filtered. A synchronizing stage 40 is coupled to a clock source 41, which provides pulses with uniform spectral density in the bandwidth $0-f_1$ to a group of n-low-pass filters 42, 43, 44, with limit frequency off. If the clock frequency is sufficient high, pulses with a duty cycle of 1 to 1000 can be supplied, which, after processing through the low-pass filters 42, 43, 44 . . . ., provide a sufficiently close approach to the function sinc (·).

Figure 6:
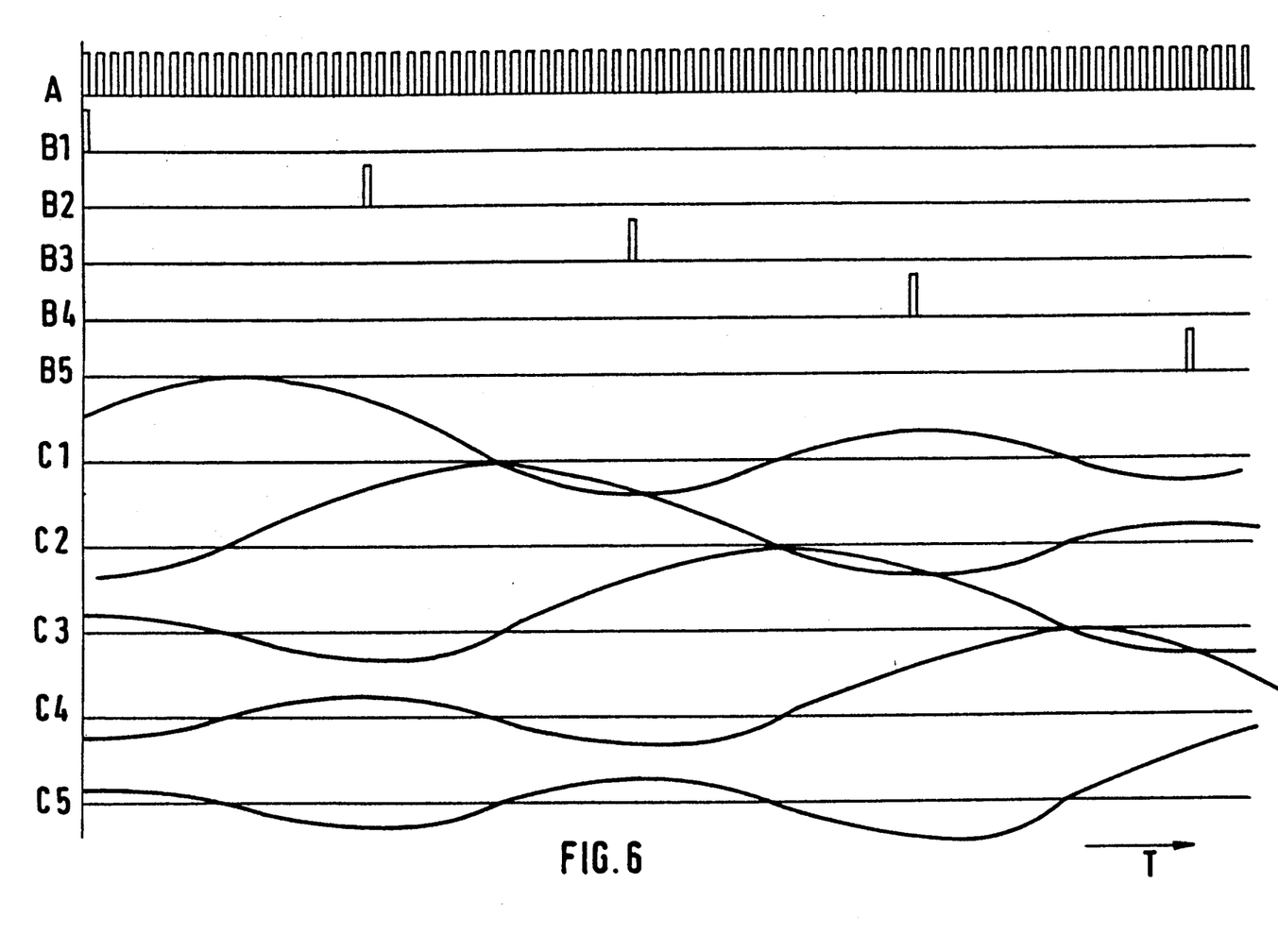
FIG. 6 shows signals occurring or generated in the system of FIG. 5.

The signals at the output of the clock 41, the inputs and outputs to the low-pass filters 42–44 are shown in FIG. 6 at graph A for clock 41, graphs B1, B2 for input of the low-pass filters 42, 43 and additional graphs, B4, B5, for similar low-pass filters of a group, down to signal Bn, which will be another signal similar to any one of the signals B1–B5. The outputs of the low-pass filters 42, 43 are shown in graphs C1, C2, and the further signals shown in FIG. 6, C3, C4, C5 would be signals derived from similar low-pass filters, not shown in FIG. 5. If low-pass filter 44 is the $n^{th}$ low-pass filter, it will have the signal B5 (FIG. 6) applied thereto and its output will be shown by the graph C5 of FIG. 6.

To obtain the signals m(t,K) in accordance with equation (10) in analog form, sinc [·] pulses at the outputs of the low-pass filters 42, 43 . . . 44 must be multiplied with the signal r(t) and the low-pass filtered with the limiting frequency $f_o$. This is carried out in a set or group of multipliers 45, 46 . . . 47 which receive as input signals the outputs C1, C2 . . . Cn from the low-pass filters 42, 43 . . . 44 and the signal r(t). The signal r(t) is obtained by a symmetrical f/V voltage converter 48 connected to the input terminal which has the signal q(t) thereon, connected to an amplifier 49 with amplification factor m and the symmetrical V/f converter 50. This series circuit corresponds to the feedback loop of the coding circuit, see FIG. 1, units 35, 36, 37. The signals at the outputs of the multipliers are then processed through low-pass filters 51, 52 . . . 53 with limit frequency $f_o$.

The low-pass filtered signals are then passed into respective delay lines 54, 55 . . . . 56 having, for example, charge-coupled devices (CCD elements) which are, in effect, charge-shifting elements, having tap points, in which for n + 1 stages, the low-pass filtered signals can be stored during a time interval corresponding to K. The outputs from the delay lines 54, 55 . . . . 56 will be scanning signals of the function m (t,K) in accordance with the equation (10). A similar CCD delay line 57 provides scanning signals of the coded signal q(t). The synchronization stage 40 ensures synchronization of the respective delay lines 54, 55, . . . 56, 57. All the stored values, or signals, respectively, are applied to a stage 58, which is a linear system inversion and non-linear feedback stage. This stage includes multipliers, adders, switches, comparators and buffer amplifiers, and supplies, by processing the signals defined in equation (9), suitable signals in accordance with a matrix inversion, to furnish scanning values of the decoded signal s(t).

Upon scanning with respect to time, one obtains, mathematically, the signals defined in equations (12).

Figure 7:
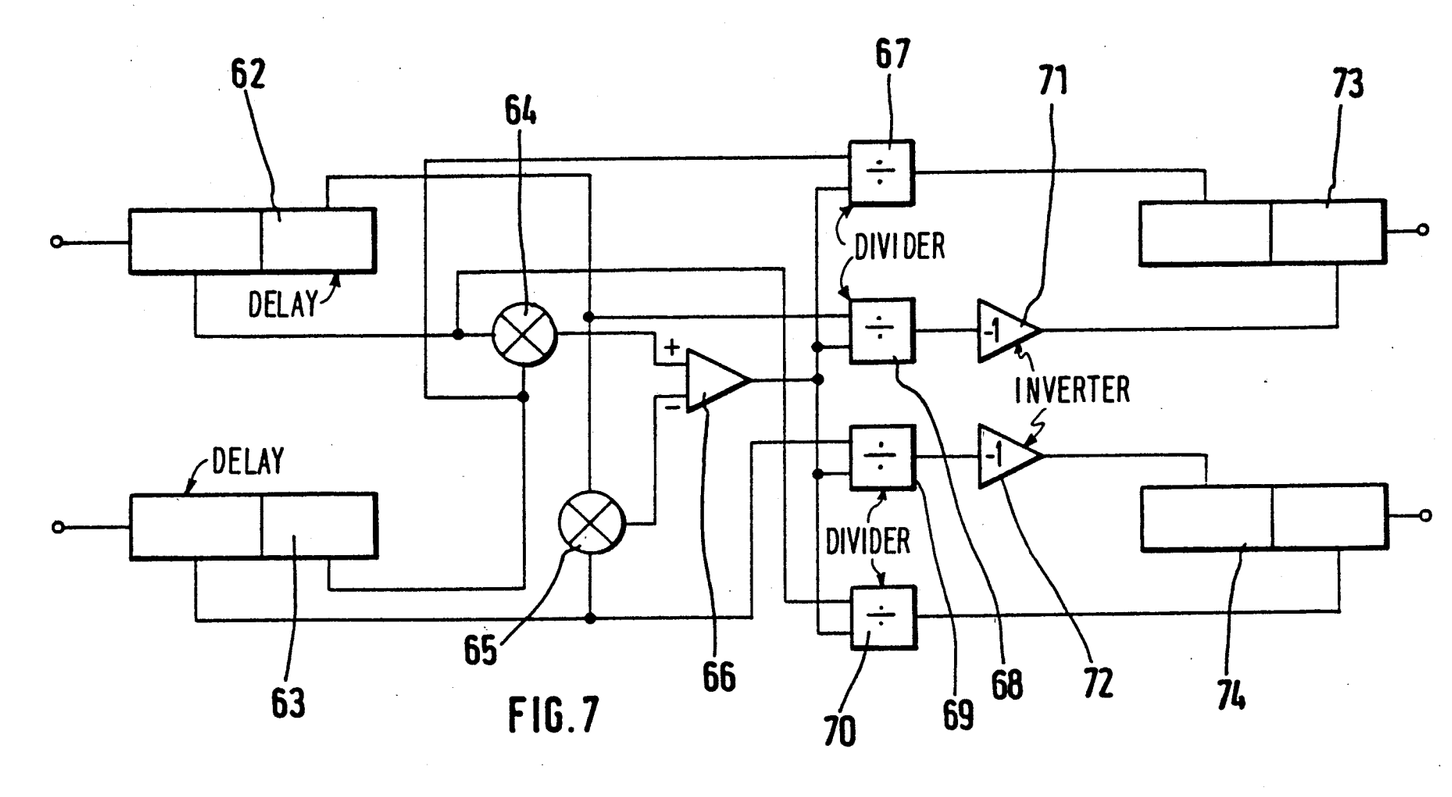
FIG. 7 is a schematic diagram of a circuit of the inverter for a 2×2 matrix.

A circuit for matrix inversion, forming part of the stage 58, is shown in FIG. 7. This matrix inversion, for simplicity, is shown only with respect to a 2×2 matrix, in accordance with the relationship (15).

The lines of the matrix m (t,K) are stored in the elements of the delay lines 54, 55 . . . 56. In case of the matrix m of FIG. 7, the two lines are stored in the delay lines 62, 63 (FIG. 7).

If one assumes the relationship of equation (16), the result will be that of relation (17) because relationship (18) pertains.

FIG. 7 shows that the elements $a_{11}$ and $a_{22}$ are multiplied in multiplier 64; $a_{21}$ and $a_{12}$ are multiplied in multiplier 65. The difference is formed in a subtraction element 66, which is applied to one input of four dividers 67, 68, 69, 70. The other inputs to the dividers have the elements $a_{11}$, $a_{12}$, $a_{21}$ and $a_{22}$ applied thereto. The dividers 68, 69 are connected to respective inverters 71, 72, in which the sign is changed. The lines of the inverted matrix are buffer-stored in the delay lines 73, 74.

Figure 8:
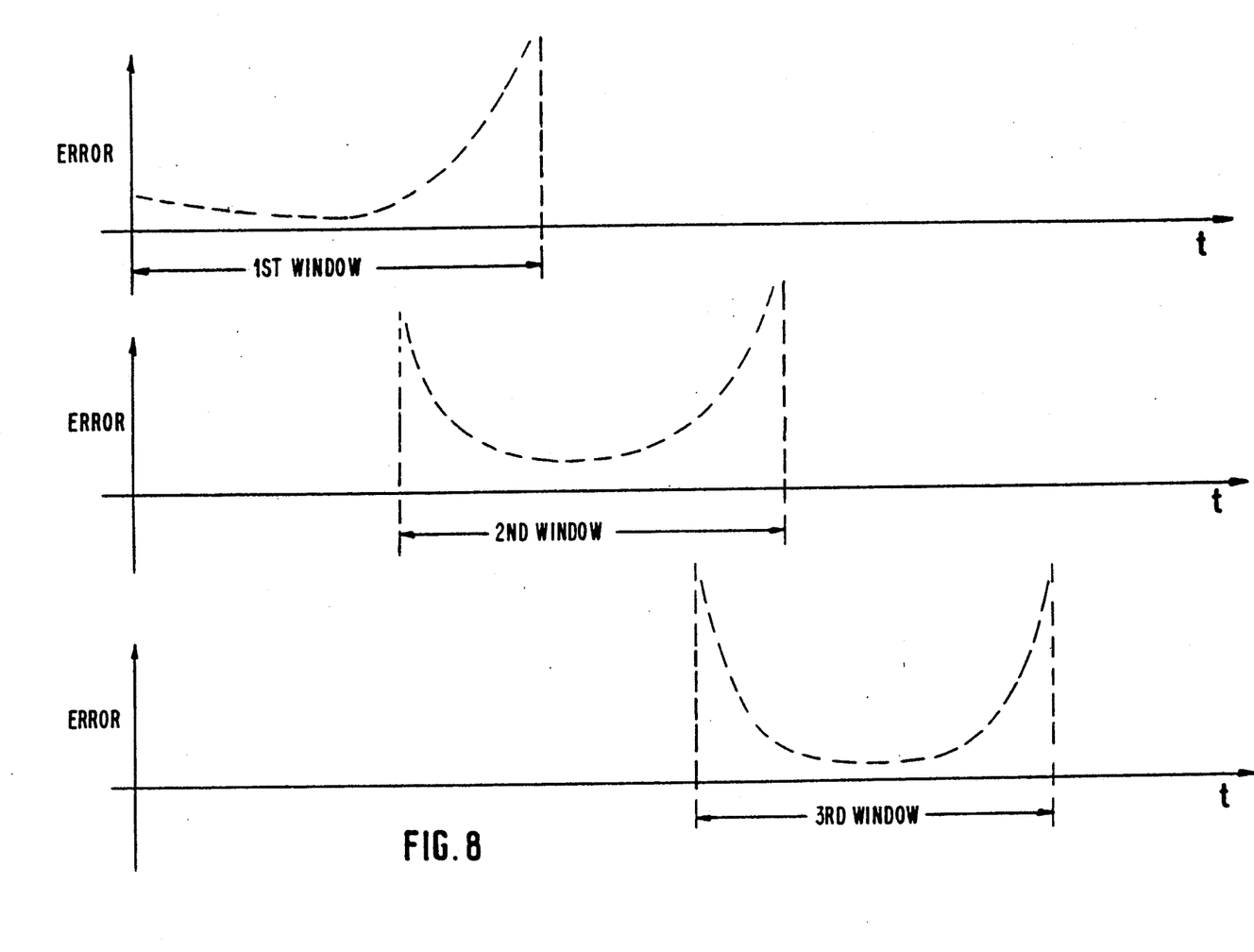

For matrix inversion, the "minimal norm inversion" method is used, the matrix m (t,k) is nearly a singular matrix (ill-conditioned) since it is carried out in time windows. For each time interval or time window, which corresponds to a matrix inversion, errors arise which are greater at the end portions than initially or in the middle, as best seen in the graphs of FIG. 8. To reduce the errors, the time windows are so arranged that they overlap. The magnitude of the errors determines the degree of overlapping. A nonlinear feed-back is used in stage 58 in order to keep the magnitude of errors up to a convenient level.

The reconstituted scanning values $s(K/2f_1)$ of the signal s(t) are obtained at the output from the stage 58. In order to form the analog signal s(t), the scanning signals are stored in a buffer 59 for serial read-out therefrom, and filtered in the low-pass filter 60 with the limit frequency $f_1$. Proper timing is ensured by the synchronization unit 40.

Various changes and modifications may be made; for example, the matrix inversion can be calculated differently, by "QR"-decomposition and/or the feed-back loop 34 of FIG. 1 can be implemented by an A/D-converter, a modified (multiplication bym) cosine look-up table and D/A converter and so on. The present description represents only one possible relation of the system, and the buffer 59 is then filled with the numeric values of the reconstituted signal.

The number of n groups or sets of the respective low-pass filters, multipliers, delay lines, and the like, depends on the desired accuracy and given compression factor, and define what might be termed an observation window. A typical value for $n/K_r$ is $n/K_r > > 25$, that is, substantially greater than 25.

TABLE OF MATHEMATICAL EQUATIONS $$s(t) = U_o \cos[\int mg(t)dt + \phi_o] \tag{1}$$

wherein
s(t) is a frequency-modulated signal,
$U_0$ the amplitude of the signal s(t),
m a constant, e.g. modulation level or depth, (FM index),
$\phi_0$ a constant initial phase,
g(t) the input signal which will be frequency modulated $$U_{f\,"cosine"} = U_{fc} = U_o \cos[\int \beta U_i(t)dt + \phi] = U_o\cos(\alpha) \quad (2)$$

wherein
$U_o$ is the output amplitude,
$U_{i(t)}$ the input signal,
$\phi$ is a constant phase given by the converter,
$\beta$ is a factor, (FM index) equivalent to "m",
t is time.

$$U_{f\,sin} = U_o \sin[\int \beta U_i(t)dt + \phi] \quad (3)$$

$$\phi_i(t) = \int \beta U_i(t)dt + \phi \quad (3')$$

$$K_r = \frac{\text{bandwidth of input signal } s(t)}{\text{bandwidth of output signal } (qt)} = \frac{f_1}{f_0} \quad (4)$$

wherein
$f_o = \omega_o/2\pi$ = limit frequency (bandwidth) of low pass 32
$f_1$ = limit frequency of input signal s(t)

$$q(t) = \int_{-\infty}^{t} S(\tau)\cos[m_0 q(\tau)] \frac{\sin \omega_0 (t - \tau - \tau_0)}{\omega_0 (t - \tau - \tau_0)} d\tau \quad (5)$$

$f_o = \omega_o/2\pi$ = limit frequency of low pass 32 and
$\tau_o$ = delay of the low pass 32.

$$r(t) = \cos(m_0 q(t)) \quad (6)$$

$$h(t) = \frac{\sin \omega_0 (t - \tau)}{\omega_0 (t - \tau_0)} \omega_0 (t, \tau_0, R) \quad (6')$$
$$= \text{sinc}[\omega_0 (t - \tau_0)] \omega_0 (t, \tau_0, R)$$

wherein $W_o(t, \tau_o, R)$ is a window function, e.g. Hamming window and R the 'Time support' of the function h(t)

$$q(t) = \int_{t-R}^{t} s(\tau)r(\tau)h(t - \tau)d\tau \quad (7)$$

wherein
W(t) is a window function, for example a Hamming function, and
K is the summation index.

$$s(t) = \sum_K s(K/2f_1) \text{sinc}[4\pi f_1 (t - K/2f_1)] W(t) \quad (8')$$

$$q(t)(K/2f_1) \int_{t-R}^{t} \text{sinc}[4\pi f_1 (\tau - K/2f_1)] W(\tau)r(\tau)h(t - \tau)d\tau \quad (9)$$

if we note by $$m(t,K) = \int_{t-R}^{t} \text{sinc}[4\pi f_1 (\tau - K/2f_1)] W(\tau)r(\tau)h(t - \tau)d\tau \quad (10)$$

then (9) became $$q(t) = \sum_K s(K/2f_1) m(t,K) \quad (11)$$

$$\left. \begin{array}{l} \text{Generally,} \quad q(t) = \sum_K s(K/2f_1) m(t,K) \\ \text{and specifically} \\ \quad q(t_1) = \sum_K s(K/2f_1) m(t_1,K) \\ \quad q(t_2) = \sum_K s(K/2f_1) m(t_2,K) \\ \quad q(t_i) = \sum_K s(K/2f_1) m(t_i,K) \end{array} \right\} \quad (12)$$

This corresponds to the matrix equation $$\| q(t_i) \| = \| m(t_i,K) \| \cdot \| s(K/2f_1) \| \quad (13)$$

which can be solved to obtain $$\| s(K/2f_1) \| = \| m(t_i,K) \|^{-1} \cdot \| q(t_i) \| \quad (14)$$

$$\| m \| = \left\| \begin{array}{cc} a_{11} & a_{12} \\ a_{21} & a_{22} \end{array} \right\| \quad (15)$$

Assuming (16) is $$D = \det \| m \| = a_{11}a_{22} - a_{12}a_{21} \neq 0 \quad (16)$$

then (17) is $$\| m \|^{-1} = \left\| \begin{array}{cc} a_{22} & -a_{12} \\ -a_{21} & a_{11} \end{array} \right\| \cdot \frac{1}{D} \quad (17)$$

because $$\| m \| \cdot \| m^{-1} \| = \quad (18)$$

$$\frac{1}{D} \left\| \begin{array}{cc} a_{11} & a_{12} \\ a_{21} & a_{22} \end{array} \right\| \cdot \left\| \begin{array}{cc} a_{22} & -a_{12} \\ -a_{21} & a_{11} \end{array} \right\| =$$

$$\frac{1}{D} \left\| \begin{array}{cc} D & O \\ O & D \end{array} \right\| = \left\| \begin{array}{cc} 1 & 0 \\ 0 & 1 \end{array} \right\| = I$$

as unitary matrix.

I claim:
1. A method of reducing the useful bandwidth of a bandwidth-limited input signal (s(t)) by coding of said input signal to derive a coded signal (q(t)), comprising combining said input signal with a feedback signal; low-pass filtering said combined input-and-feedback signal to derive said coded signal (q(t)), passing the coded signal (q(t)) through a feedback loop for combination with said input signal, and, in said feedback loop frequency-demodulating the combined signal and forming a frequency-demodulated feedback signal;

amplifying the frequency-demodulated feedback signal; and frequency-modulating said amplified feedback signal to form a signal with a higher FM index, said feedback signal being combined with said input signal to form said combined signal.

2. The method of claim 1, wherein said amplification step within the feedback loop comprises amplifying the frequency-demodulated feedback signal to such an extent that the bandwidth of the frequency-modulated signal upon subsequent frequency modulation is wider than the bandwidth of the input signal (s(t)).

3. The method of claim 1, wherein said input signal is a frequency-modulated signal.

4. System for reducing the useful bandwidth of a bandwith-limited input signal (s(t)) by coding thereof to obtain a coded signal (q(t)),
said system comprising
a closed loop circuit having
having a multiplier (31) having one input coupled to the input signal (s(t));
a low-pass filter (32) receiving the output of the multiplier (31), the output of the lower-pass filter (32)
(a) forming the output of the system; and
(b) being coupled to a feedback loop (34),
wherein said feedback loop (34) includes
a symmetrical frequency-voltage (f/V) converter (35) providing a frequency-demodulated feedback signal;
an amplifier (36) amplifying the frequency-demodulated feedback signal; and
a symmetrical voltage-frequency (V/f) converter (37) to convert the amplified-demodulated feedback signal in a frequency-modulated feedback signal,
said feedback signal being coupled to a second input of the multiplier (31).

5. The system of claim 4, wherein the amplification factor of said amplifier (36) is so high that the bandwidth of the signal at the output of the symmetrical voltage/frequency (V/f) converter (37) is greater than the bandwidth of the input signal (s(t)).

6. A method for decoding a coded signal (q(t)), coded in accordance with the method of claim 1, comprising the steps of
generating a sequence of n pulses having a small duty ratio and uniform spectral density, and generating first scanning signals having the characteristics of equation (10) of the table of equations;
low-pass filtering said scanning signal with a limit frequency of $f_1$;
conducting the coded bandwidth-limited input signal (q(t)) through a symmetrical frequency-voltage (f/V) converter (35), an amplifier (36) and a voltage-frequency (V/f) converter (37) to obtain a derived coded signal r(t);
multiplying the derived coded signal with said first scanning signals;
low-pass filtering the sequence of the resulting signals with a limiting frequency of $f_o$;
storing said set of resulting signals in n delay lines for predetermined periods of time and applying said signals as second scanning signals (m(t,K)) to an inverting circuit (58);
generating scanning signals from said coded input signals (q(t)) and stored in a delay line (57);
and processing the so derived signals in accordance with the equations, and specifically $$q(t) = \sum_K s(K/2f_1)m(t,K)$$

$$q(t_1) = \sum_K s(K/2f_1)m(t_1,K)$$

$$q(t_2) = \sum_K s(K/2f_1)m(t_2,K)$$

$$q(t_i) = \sum_K s(K/2f_1)m(t_i,K)$$

which corresponds to the matrix equation $$\| q(t_i) \| = \| m(t_i,X) \| \cdot \| s(K/2f_1) \|$$

which can be solved to obtain $$\| s(K/2f_1) \| = \| m(t_i,K) \|^{-1} \cdot \| q(t_{il}) \|$$

wherein,
s (t) is a bandwidth limited input signal;
q (t) is a derived, coded signal;
m is a constant, representative of modulation level or depth, or FM index;
t is time;
$f_1$ is the limit frequency of the frequency modulated input signal; and
k is the summation index
to generate fourth scanning signals (s (K/2 $f_1$)) of the decoded signal (s(t)) by matrix inversion.

7. The method of claim 6, wherein said fourth scanning signals (s(K/2 $f_1$)) of the decoded signal (s(t)) are buffer-stored;
and including the step of serially reading out said buffer-stored signals and low-pass filtering said signals with the limiting frequency of ($f_1$), wherein $f_1$ is defined in the table of equations.

8. The method of claim 6, wherein the pulses of the sequence of n pulses have a duty ratio of 1/1000 or less, e.g. 1/10000.

9. The method of claim 7, wherein the pulses of the sequence of n pulses have a duty ratio of 1/1000 or less, e.g. 1/10000.

10. A system for decoding of a coded signal (q(t)), coded by the system of claim 4, comprising
a clock source (41) for generating a sequence of n pulses having a short duty ratio;
a synchronizing stage (40) coupled to the clock source;
a set of n low-pass filters (42-44), having a limiting frequency of $f_1$, coupled to the synchronizing stage;
a set of n multipliers (45, 47), each having one input coupled to a respective one of said low-pass filters (42-44);
a symmetrical frequency-voltage (f/V) converter (48) coupled to receive the coded signal (q(t)), an amplifier (49) coupled to the f/V converter (48) and a voltage-frequency converter (50) to provide a modified, amplified coded signal (r(t)), the output of the V/f converter (50) being coupled to a second input of each of the multipliers (45-47);

a set of low-pass filters (51-53) each coupled to a respective output of a multiplier (45, 47) and having a limiting frequency ($f_o$);

a set of n delay lines (54-56), each coupled to an output of a respective one of the low-pass filters (51-54), said synchronizing stage (40) synchronizing said delay lines (54-56);

an additional delay line (57) coupled to receive the coded signal q (t)) and synchronized by said synchronizing stage (40);

and an inverting circuit stage (58) coupled to all said delay lines, and to said synchronizing stage (40), said inverting stage being connected for matrix inversion of the applied signal.

11. The system of claim 10, wherein said inverting stage (58) includes at least one of: a multiplier, an adder, a switch, a comparator, a buffer.

12. The system of claim 10, further including a buffer (59) coupled to the output of the inverting stage and synchronized by being coupled to said synchronizing stage (40);

a low-pass filter (60) with a limiting frequency ($f_1$) being coupled to receive the output from the buffer amplifier, and providing the decoded signal (s(t)).

13. The system of claim 10, wherein $n/K_r$ is substantially greater than 25.

14. The system of claim 10, wherein said duty ratio is in the order of about at most 1/1000.

* * * * *